(No Model.)
H. F. CAMPBELL.
MECHANISM FOR AND METHOD OF FORMING HOOP SPLINTS.
No. 255,412.   Patented Mar. 28, 1882.
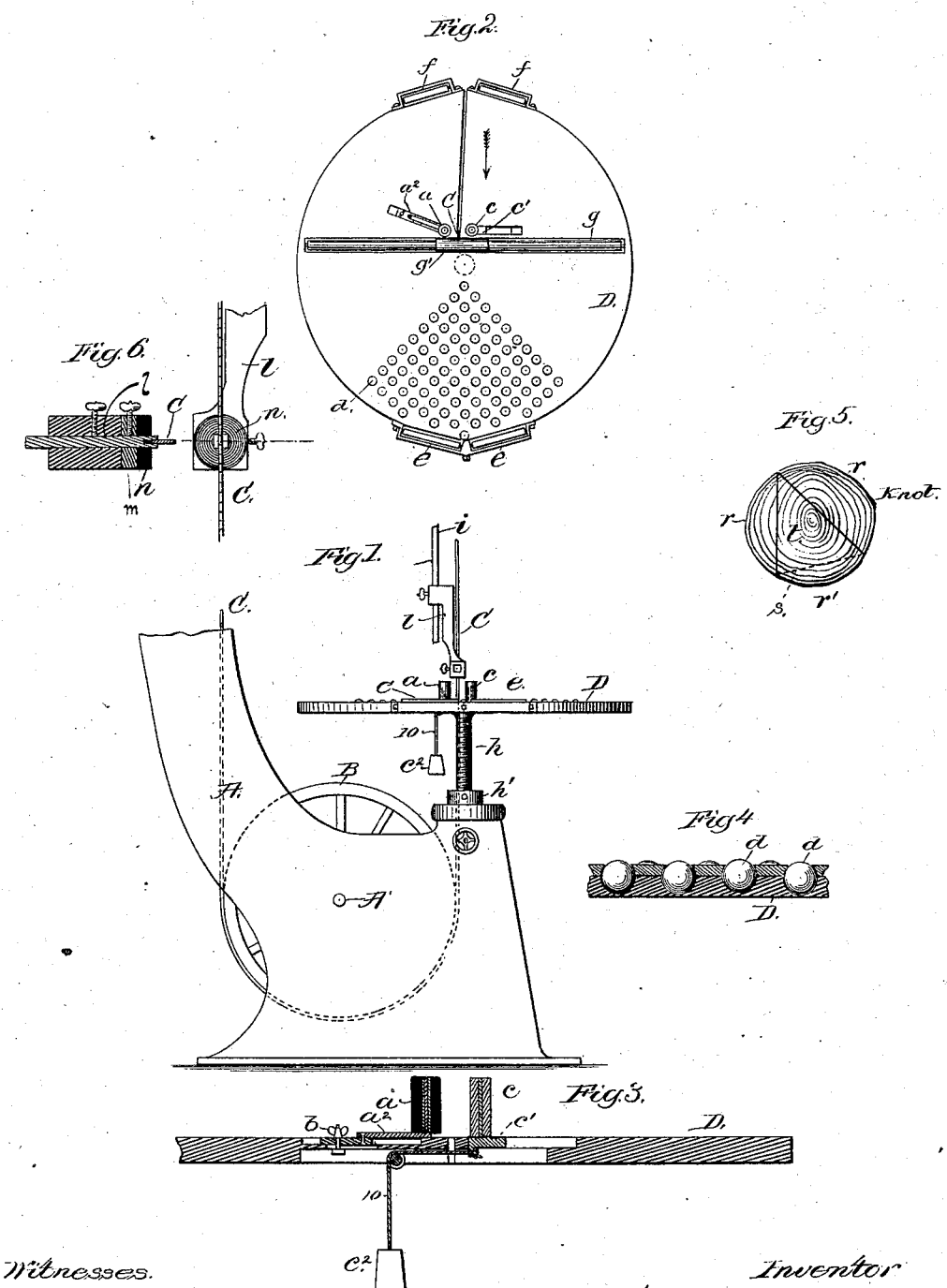

UNITED STATES PATENT OFFICE.

HENRY F. CAMPBELL, OF CONCORD, NEW HAMPSHIRE.

MECHANISM FOR AND METHOD OF FORMING HOOP-SPLINTS.

SPECIFICATION forming part of Letters Patent No. 255,412, dated March 28, 1882.

Application filed December 12, 1881. (No model.)

*To all whom it may concern:*

Be it known that I, HENRY F. CAMPBELL, of Concord, county of Merrimack, State of New Hampshire, have invented an Improvement in Mechanism for and Method of Forming Hoop-Splints, of which the following description, in connection with the accompanying drawings, is a specification.

This invention has for its object the production of a machine to readily saw hoop-splints from hoop-poles more or less crooked or knotty, the degree of curvature of the poles at their crooked parts or the frequency, size, or character of the knots not affecting the production of a splint for a merchantable hoop. In my method I embed the warts, knots, and short crooks of that part of the hoop-pole which is to appear in and form part of the splint, being produced into a roller having an elastic surface, and while the knots and warts are so embedded the splint is cut from the pole by means of a band-saw, which operates thereon in a line parallel with the center or heart of the hoop-pole, and that notwithstanding its curvature and crooks.

Prior to this my invention hoop-splints retaining the bark have been produced by a splitting operation, and only comparatively straight poles, free from large or bad knots, could be used; and, further, such poles, whether split by hand or by mechanical devices, must in cold weather have the frost removed from them before splitting. By my process the poles may be cut equally well under all atmospheric conditions.

My hoop-splint-forming machine is composed essentially of a support for the hoop-pole, an elastic roll in which to embed the knots, warts, and short crooks, a roller or presser to aid in forcing the said knots and warts into the elastic surface of the opposed roller, and a band-saw.

This invention will be employed to produce hoop-splints to be subsequently dressed uniformly and evenly on a machine patented to me (No 248,021) October 11, 1881, to which reference may be had.

Figure 1 represents in partial side elevation a sufficient portion of a machine containing my invention to enable the same to be understood; Fig. 2, a top view of the bed or table, Fig. 1; Fig. 3, an enlarged sectional detail, showing the supporting bed or table for the hoop-pole, its elastic-surfaced roller, and its opposed pressure-roller. Fig. 4 is an enlarged detail of the surface of the supporting bed or table as I prefer to make it, and Fig. 5 is a section of a hoop-pole cut in accordance with my invention, and Fig. 6 is details of the upper guide for the band-saw.

The frame-work or standard A has at its lower end a cross-shaft, A', which in practice will be driven in any usual way by means of a belt and any usual form of fast and loose pulley. (Not shown.) The upper part of the frame A will in practice have a like parallel cross-shaft, and both these cross-shafts will have secured to them a pulley, B, the surface of which will preferably be covered with india-rubber to adhere to and cause the band-saw C to be driven steadily in one direction without unnecessary jar, all as usual in wood-working machines containing band-saws.

The hoop-pole support or table D has a central slot for the passage of the band-saw, and near the said slot is a vertically-placed elastic or india-rubber-surfaced roller, $a$, carried or held upon a frame, $a^2$, adjustably connected with the table D by means of a suitable adjusting device, herein shown as a set-screw and nut, $b$, the said frame $a^2$ being made adjustable toward and from the side and back or plain edge of the band-saw. The elastic surface of the roller $a$ enables the warts, knots, and short crooks of the hoop-pole to be embedded into its substance by the action against the opposite side of the hoop-pole of the pressure-roller $c$, preferably of wood or iron, the said roller being held upon a slide, $c'$, acted upon to keep the presser or roller $c$ against the hoop-pole, by means of a suitable weight, $c^2$, or it might be a spring.

When very crooked portions of poles of considerable size and length are being sawed, the direction of the presentation of the pole to the rapidly-moving band-saw must be suddenly changed. To accomplish this readily the surface of the bed or table D is provided with a series of anti-friction balls, $d$. (Shown most clearly in Fig. 4.) These balls are and may be held in any suitable sockets. The heavy parts of the hoop-pole being sawed rest upon the upper portion of these balls $d$, so that it may be moved quickly and suddenly from side to side on the occurrence of sharp crooks near the band-saw, thus enabling the operator to quickly move the pole with the minimum of friction, and this is of especial advantage when a hoop-splint has been nearly removed from the pole and the principal length of the pole has been advanced beyond the band-saw. The table or bed will have at its edges suitable rollers, $e\,f$, to facilitate the movement of the pole across the table as it is being sawed.

Just in front of the band-saw (see Fig. 2) the table or bed D is slotted to receive a long roller, $g$, the central part of which at each side of the band-saw is grooved to receive upon it or about its periphery a collar composed of consolidated or hardened leather, $g'$. This table or bed D is carried by a screw, $h$, extended through a suitable nut, $h'$, by aid of which the table or bed may be elevated or depressed to accommodate the height of the operator. Above the table or bed the band-saw is passed through a guide, $l$, made vertically adjustable on a rod, $i$, suitably held at and depending from the upper part of the frame-work of the machine.

To obviate heating the saw by friction against a movable disk, $m$, of chilled iron or other metal, as now commonly used to steady the saw and resist strain, the guide $l$ is herein shown as provided with the usual disk, but its face is herein covered with a washer or disk, $n$, of compressed or hardened leather, as shown in Fig. 6. In practice I have found that the employment of this hardened or compressed leather washer $n$ enables the evils resulting from the rapid hardening and breakage of band-saws to be practically obviated.

The employment of the elastic-surfaced roller, as described, makes it possible to produce a hoop-splint the back of which is parallel with the heart of the pole being sawed, and also prevents breaking of saws, as would be the result if the said roller had a rigid surface and a knot or short crook of sufficient size or extent came in contact with it to bend the saw laterally.

In connection with the weight $c^2$ on the cord 10 to keep the roller $c$ against the pole I may employ a lever or treadle, joined with the weight or cord in any suitable way, by which to augment the pressure of the roller $c$ on the pole when desired—as, for instance, on the occurrence of a large knot or sharp crook—thereby relieving the saw and effectually burying the knots or short crooks in the substance of the elastic roll $a$.

Fig. 5 shows an end view of a hoop-pole sawed into three pieces. The two pieces marked $r$ may be dressed, when desired, in my patented machine referred to, for forming hoops. The piece $r'$ must be subsequently sawed on the dotted line $s$, leaving as waste the central part $t$.

A hoop-machine is old in which two opposed feed-rollers have been employed, one of such rollers being arranged in a spring-bearing, so as to yield to the surface of the material being cut.

I claim—

1. The table or bed to support the hoop-pole and a band-saw to cut the hoops, combined with an elastic-surfaced roller in which to embed the knots, warts, and short crooks of the hoop-pole, and with a suitable presser to keep the hoop-pole pressed against the said elastic-surfaced roller, substantially as described.

2. The table D, the anti-friction balls $d$, arranged therein, the edge-rollers $e\,f$, and the roller $g\,g'$, combined and arranged substantially as shown and described.

3. The herein-described method or process of producing hoop-splints which are to retain the natural bark, which consists in embedding the knots, warts, and short crooks of that part of the hoop-pole to be contained in the splint then being produced into the substance of an elastic roller, against which the hoop-pole is pressed, and sawing the said splint from the pole parallel with the center of the pole whatever may be its curvature, substantially as described.

In testimony whereof I have signed my name to this specification in the presence of two subscribing witnesses.

HENRY F. CAMPBELL.

Witnesses:
G. W. GREGORY,
B. J. NOYES.